Sept. 12, 1933.  K. VON MAYRHAUSER  1,926,251
ANGLE MEASURING DEVICE
Filed May 28, 1930
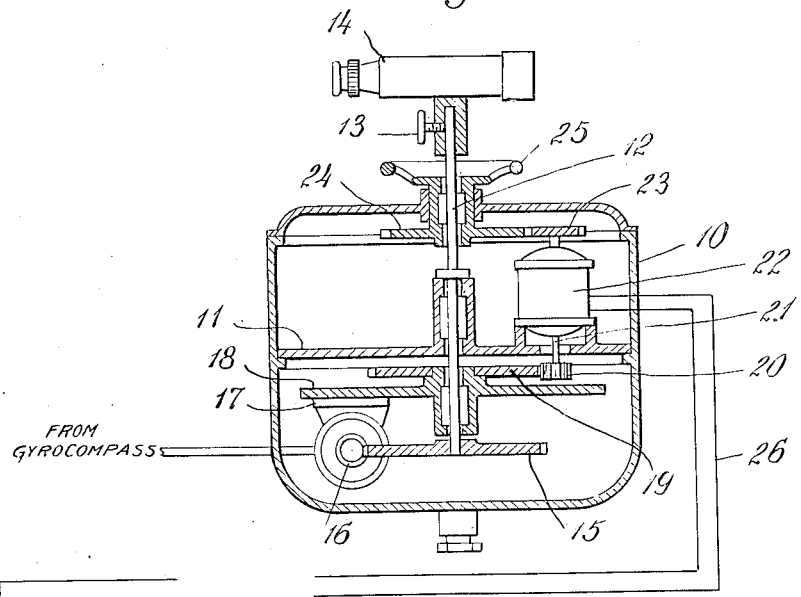
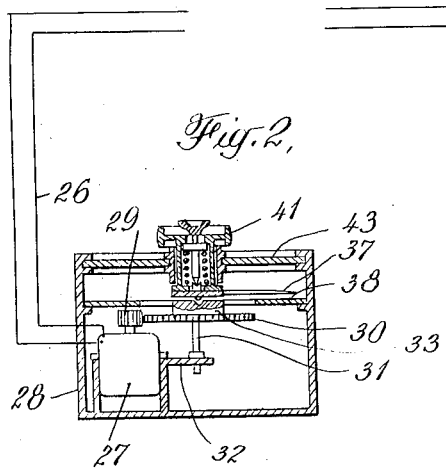
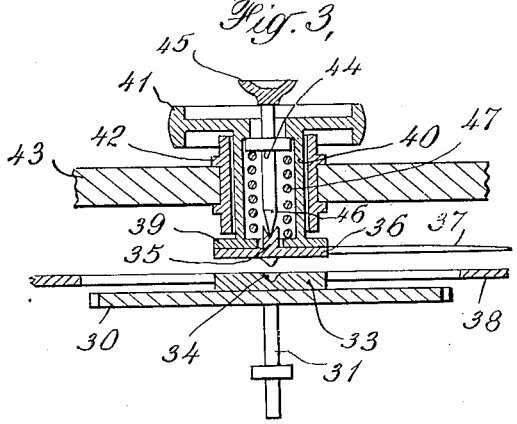
INVENTOR
Kurt von Mayrhauser
BY
Pennie, Davis, Marvin & Edmonds
ATTORNEYS Patented Sept. 12, 1933

1,926,251

UNITED STATES PATENT OFFICE 1,926,251

ANGLE MEASURING DEVICE

Kurt von Mayrhauser, Kiel, Germany, assignor to Nederlandschen Technischen Handel Maatschappij "Giro"

Application May 28, 1930, Serial No. 456,791, and in Germany May 24, 1929

6 Claims. (Cl. 33—72)

This invention relates to devices for measuring angles and has particular reference to observation instruments used upon dirigible craft whose uneven motion makes stabilization of the instruments necessary.

Heretofore it has been the practice to effect the stabilization of a telescope or the like against movements of the ship or other craft about a vertical axis by mounting the telescope for adjustment in azimuth upon a gyroscopic compass or its auxiliary or repeater compass.

It is the principal object of this invention to improve this present method of stabilizing observation instruments by providing auxiliary mechanism whereby the position and/or course of remote objects, such as targets, with reference to the position and/or course of the observing craft are obtainable without being subjected to the disturbances caused by movement of the vessel, whereby observation is facilitated and greater accuracy is obtainable.

This and other objects of this invention are obtained in a preferred embodiment thereof in which the observation instrument, mounted upon a gyroscopic compass, gyroscopic auxiliary or repeater compass or other body which is stabilized about the vertical axis, is adjustable manually in azimuth relatively to the stabilized body in such a way that this manual adjustment thereof may be made more rapidly than the relatively slow movement of the craft, and two movements, either additive or substractive, are superimposed. The manual adjustment is transmitted electrically to a remote angle indicator having a pointer or needle which may be made operative or inoperative at will, and which cooperates with a finely graduated scale. In this way a remote observer can measure with extraordinary accuracy at will the angle through which the observation instrument has moved manually without considering and compensating for the more or less continuous variation introduced by movements of the vessel about the vertical axis, nor for any violent manual adjustments of the observation instrument. The remote indicator therefore is not compared with a compass card in azimuth but measures directly the difference between two azimuthal angles between which the remote object or target has moved. Thus, synchronization between the indicator and the master compass is not necessary.

For a better understanding of this invention, reference is made to the accompanying drawing, in which Figure 1 is a vertical section through the displaceable observation and angle transmitting device of this invention;

Fig. 2 is a vertical section of the remote receiver and indicator adapted to be connected electrically to the device of Fig. 1; and Fig. 3 is an enlarged illustration of the manual control of the indicator of Fig. 2.

In this drawing numeral 10 designates a casing or housing adapted to be mounted in gimbal rings or in a Cardan joint, not shown. This casing 10 is fitted with a horizontal platform 11, in which is journalled the vertical shaft 12. Mounted upon the upper end of shaft 12 and adjustably secured thereto by set screw 13, is an observation instrument 14, which may be a telescope of the binocular type. Mounted upon the lower end of vertical shaft 12 is a worm wheel 15 adapted to be driven by worm 16 mounted upon the shaft of compass repeater motor 17 electrically connected to so as to be driven in azimuth by a remote gyroscopic compass transmitter of the conventional type, not shown. Thus, the shaft 12 and observation instrument 14 are driven from the remote gyrocompass whenever the craft upon which the instrument is mounted moves in yaw about the vertical axis so that these movements of the craft are compensated for and the instrument 14 is stabilized.

The compass repeater 17 is secured to a turntable 18 journalled on shaft 12 so as to be movable relatively thereto. Secured upon turntable 18 is a spur gear 19 meshing with a spur pinion 20. Pinion 20 is mounted upon the lower end of the shaft 21 of an electrical transmitter 22 supported upon platform 11, and whose function will be described later. The other or upper end of transmitter shaft 21 carries the spur pinion 23, which meshes with the spur gear 24 journaled in casing 10 and upon shaft 12. This gear 24 carries the hand-wheel 25, which extends outside of the casing 10 and encircles shaft 12 below the instrument 14.

It will be seen that repeater motor 17 drives the observation instrument 14 in accordance with movements of the craft upon which it is mounted, but that the repeater motor 17 itself may be moved bodily by hand-wheel 25 to shift the telescope relatively to the normal azimuthal position continually maintained by the remote gyrocompass. When hand-wheel 25 is turned, the gears 23 and 24 rotate the rotor of transmitter 22, and this rotation is transmitted through wires 26 to the remote electrical receiver motor which also turns through the same angle.

This remote receiver motor is identified by numeral 27 in Fig. 2, and is mounted in indicator casing or housing 28 located in the plotting room or the like of the vessel. The shaft of receiver motor 27 carries the spur pinion 29, which meshes with so as to drive the spur gear 30 mounted upon a short shaft 31 journaled in a bracket 32 and located centrally in the casing 28. Mounted axially upon the upper surface of spur gear 30 is a clutch disc or pointer support 33 having a centering notch or groove 34 for the reception of the cooperating end of stud 35 upon which the disc 36 carrying pointer 37 is mounted, as is shown in greater detail in the enlarged section illustrated in Fig. 3. Discs 33 and 36 and stud 35 and notch 34 are normally disengaged, but may be engaged manually at will when it is desired to transfer the movement imparted by the remote device of Fig. 1 to receiver motor 27 through gears 29 and 30 to pointer 37. The pointer 37 coacts with scale 38 mounted upon a bead inside of casing 28, the pointer 37 indicating the change in angle of the target. The ratio of transmission between the instrument 14 and remote pointer 37 is such that the pointer 37 indicates on the scale 38 a definite number of angular units into which the scale 38 is graduated, and which are preferably either sixteenths of a degree or the so-called artillery thousandths, i. e., $2\pi/6400$.

Although discs 34 and 36 are normally disengaged, disc 36 is normally maintained in frictional engagement with disc 39 formed on the lower end of sleeve or collar 40, which carries a hand-wheel 41 at its upper end and is journalled in a bearing 42 inserted in the observation window 43 constituting the top of casing 28 and through which the pointer 37 and scale 38 may be observed.

In the hollow center of sleeve or collar 40 is mounted the plunger 44 having at its upper end the button 45 and at its lower end a conical antifriction tip 46 which is adapted to engage a socket in the upper end of pointer stud 35 for pushing its disc 36 into frictional contact with disc 33 and out of engagement with disc 39. The tip 46 of plunger 44 and the stud 35 are normally maintained disengaged by a spring 47 inserted in sleeve 40 and constraining the plunger 44 upwardly. Thus, when button 45 is pressed and held down, discs 34 and 36 engage and the pointer 37 is driven by and in accordance with the movements of the receiver motor, and when the button 45 is released, the spring 47 raises the plunger 44 and discs 34 and 36 disengage to break the driving connection between the pointer 37 and receiver motor 27. When the pointer 37 is thus driven, its stud 35 rotates freely relatively to the tip 46 which holds it down, there being no drag caused by this stationary tip because of its anti-friction connection with stud 35. Also, when hand-wheel 41 is rotated, the driving connection between discs 36 and 39 permits the pointer 37 to be positioned anywhere on the scale 38, such as at the zero point, independently of the movements of the receiver motor 27 and the intervening parts.

In operation, the observation instrument 14 is normally maintained stabilized in azimuth by the remote master gyrocompass through the electrical connection between the latter and the repeater motor 17, worm 16, worm wheel 15, and shaft 12, upon which the observation instrument is mounted. In order to swing the observation instrument around rapidly to bear on a remote target such as a moving vessel, thumb screw 13 is loosened and the instrument may be moved relatively to its shaft 12 to the proper position, and then thumb screw 13 is tightened to reconnect instrument 14 and its shaft 12.

If the bearing of the remote moving target or vessel is to be taken, the cross hairs of the instrument 14 may be maintained upon the remote target or vessel by rotating the hand-wheel 25 accordingly so that its azimuth changes uniformly in accordance with the course and speed of the target. Since the instrument 14 is initially stabilized in azimuth by the gyrocompass, the yawing of own ship does not affect or disturb the observations, the manual adjustment of the instrument being superimposed upon the stabilizing movements introduced by the gyrocompass. This is the case, because the turning of hand-wheel 25 moves the receiver motor 17 bodily through hand-wheel gear 24, pinion 23, shaft 21, pinion 20, gear 19 and turntable 18 upon which the receiver motor 17 is mounted.

Inasmuch as the only manual movements of hand-wheel 25 are imparted to the rotor of electrical transmitter 22, these movements are transmitted through cable 26 to the receiver motor 27 of the remote indicating device illustrated in Fig. 2. The observer at this indicating device, after rotating hand-wheel 41 to turn the pointer 37 to the zero or other starting position on the scale 38, may then press button 45 so that discs 34 and 36 are engaged and note the time during which the pointer 37 is driven through an angle indicated thereby on the scale 38. This angular movement of pointer 37 reproduces or simulates the change in azimuth of the target or vessel observed, because the pointer 37 is connected to the receiver motor 27 through gears 29 and 30, and discs 34 and 36. When a predetermined time has elapsed, the observer releases button 45 and the pointer 37 stops instantly so that the angle through which it has moved may be measured.

It will be seen that both at the beginning and end of the indicating operation the pointer 37 is stationary relatively to the scale 38 so that the observer has time to carefully measure the angle through which the pointer has moved, whereby extraordinary accuracy may be obtained. Thus the device does not measure against or with reference to a moving compass card, but measures the angle directly, and it is not necessary to maintain synchronism with the master compass.

Moreover, the entire measurement is performed by two observers, one of whom may concentrate his entire attention to observing the target, and the other may concentrate his entire attention to measurement of the angles, whereby great accuracy will be obtained. Also, any violent movement of the instrument 14, such as when the thumb-screw 13 is loosened, is not transmitted to the indicator, so that the remote indicator observer has no knowledge thereof, and is not disturbed thereby, but has only the movements of the remote target in azimuth to consider.

While a preferred embodiment of the invention has been illustrated and described herein, it is to be understood that the invention is not limited thereby, but is susceptible of many changes in form and detail within its scope.

I claim:

1. In a device of the character described, the combination of an observation instrument adapted to be mounted upon dirigible craft, a gyrocompass repeater for stabilizing said instrument in azimuth against yawing movements of said craft, means for adjusting said instrument in azimuth and moving said repeater bodily whereby the adjustments of said instruments are independent of the movements of said repeater, and an indicator driven by said means independently of the movements of said repeater.

2. In a device of the character described, the combination of a motor, an indicator mechanically rotatable by said motor, a normally disengaged clutch for connecting and disconnecting the indicator to the motor, a portion of said indicator being directly carried by one of the clutch members, a manual member for mechanically adjusting the indicator, and a normally engaged clutch for connecting and disconnecting the manual adjusting member to the indicator, and means for simultaneously opening said normally engaged clutch and closing said disengaged clutch whereby the indicator may be alternatively connected to the motor or adjusted manually.

3. In a device of the character described, the combination of a motor, a scale, a pointer movable over the scale and mechanically rotatable by said motor, a clutch between the motor and the pointer, the pointer being directly carried by one of the clutch members, a manual member for mechanically rotating the pointer, a clutch between the member and the pointer, one of said clutches being normally engaged and the other clutch being normally disengaged, and means for disengaging the normally engaged clutch and engaging the normally disengaged clutch to alternatively clutch the motor or the manual member to the pointer.

4. In a device of the character described, the combination of a motor, a scale, a pointer movable over the scale and mechanically rotatable by said motor, a clutch between the motor and the pointer, the pointer being directly carried by one of the clutch members, a manual adjusting member for mechanically rotating the pointer, a clutch between the member and the pointer, means normally holding one of said clutches disengaged and the other clutch engaged, and manual means operatively connected to said other means for overcoming the same and disengaging the normally engaged clutch and engaging the normally disengaged clutch, whereby the pointer may be alternatively actuated by the motor or the manual member.

5. In a device of the character described, the combination of a motor, a scale, a pointer movable over the scale, a clutch between the motor and the pointer, a manual member for actuating the pointer, a clutch between the member and the pointer, a spring normally holding the motor clutch disengaged and the manual member clutch engaged, and a manual plunger operatively connected to the spring for disengaging the manual member clutch and engaging the motor clutch, whereby the motor actuates the pointer during the time that the plunger is actuated.

6. In a repeating device for a remote angle measuring device having a transmitter, the combination of a repeater motor connected to the remote transmitter for actuation thereby, a scale, a pointer movable over the scale, manual means for adjusting the pointer at an initial position on the scale, and a manual clutch for connecting the pointer and the motor, whereby the motor moves the pointer relative to the scale from said initial position through an angle determined by the remote angle measuring device.

KURT von MAYRHAUSER.